Patented Dec. 1, 1953

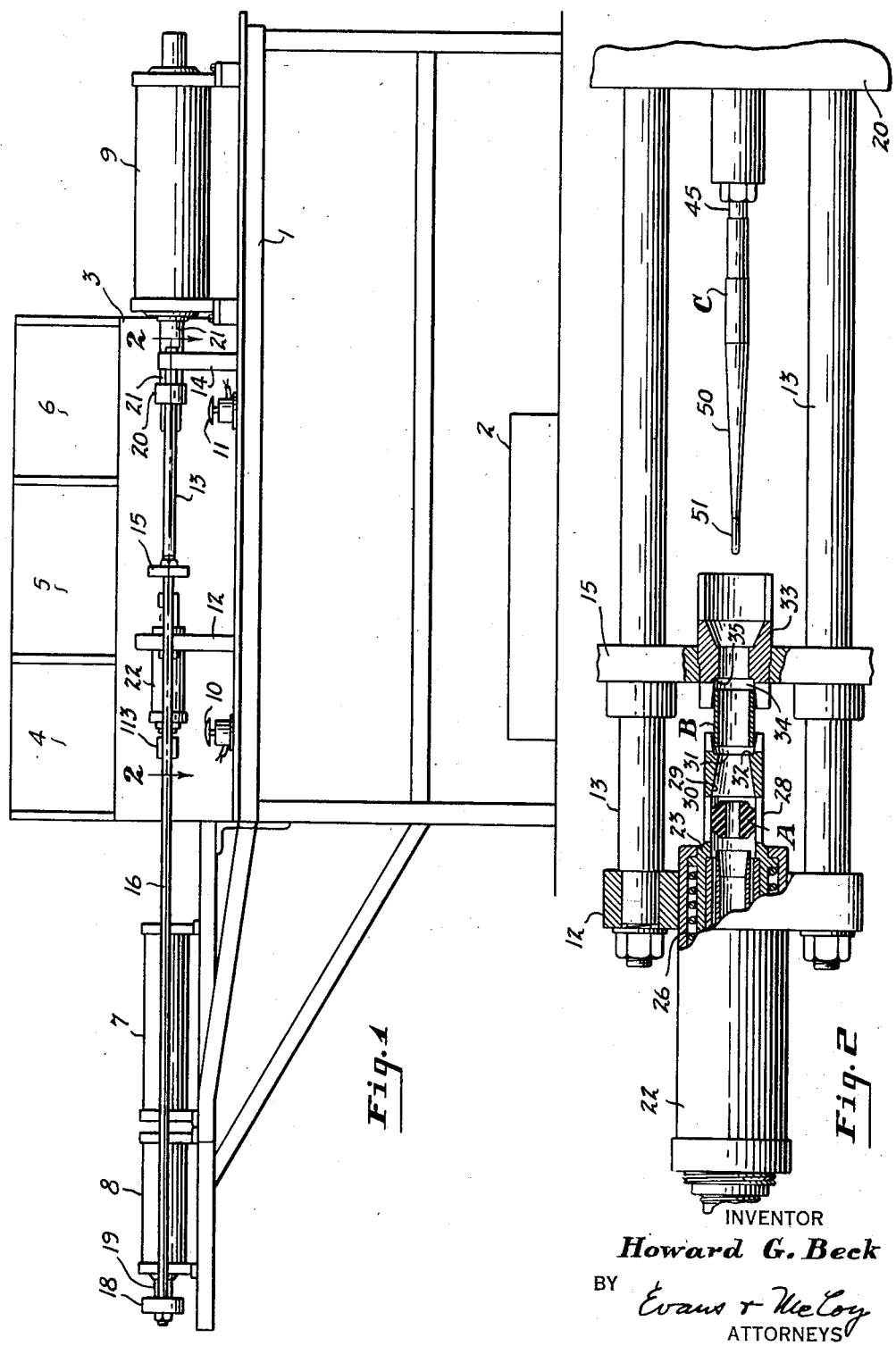

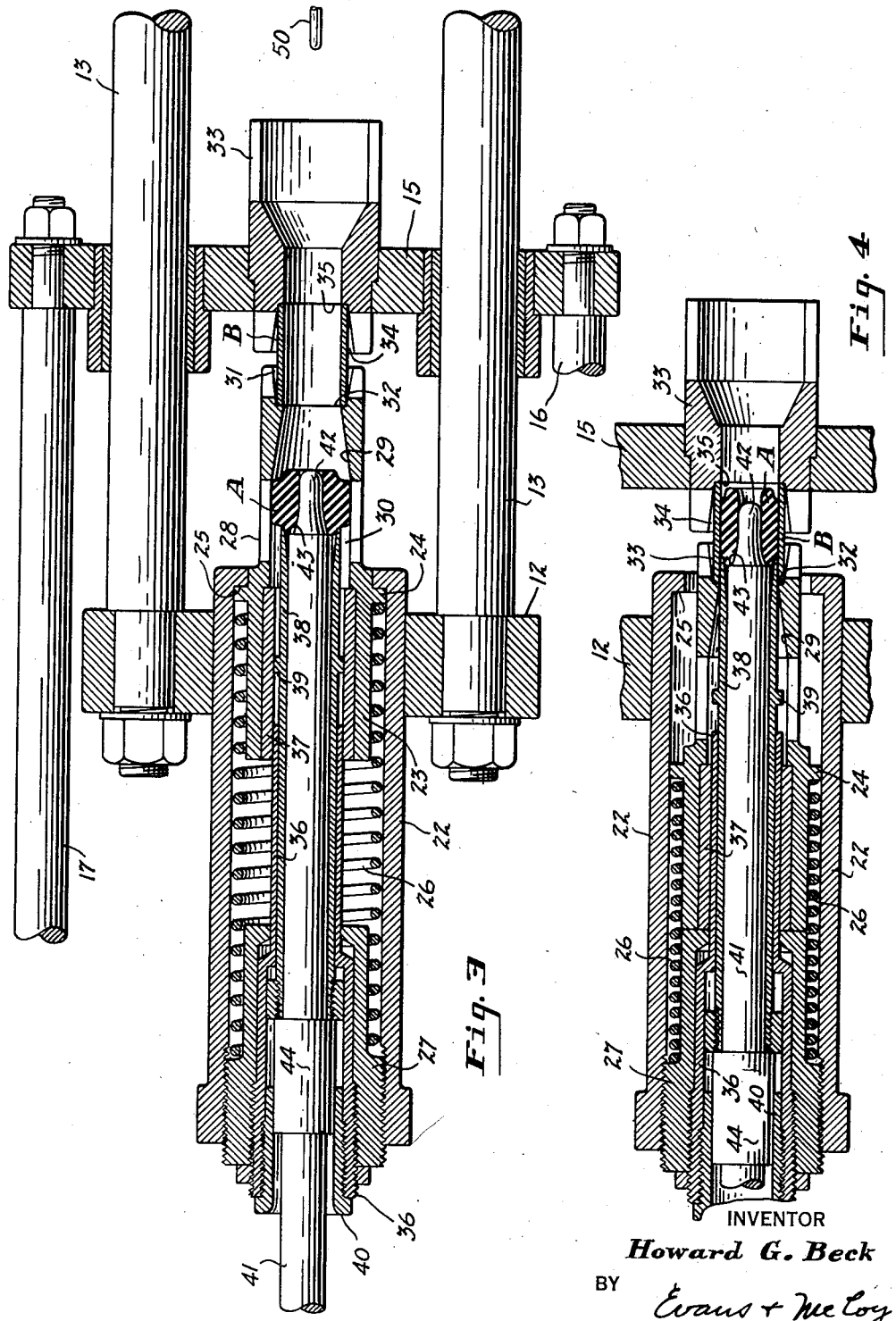

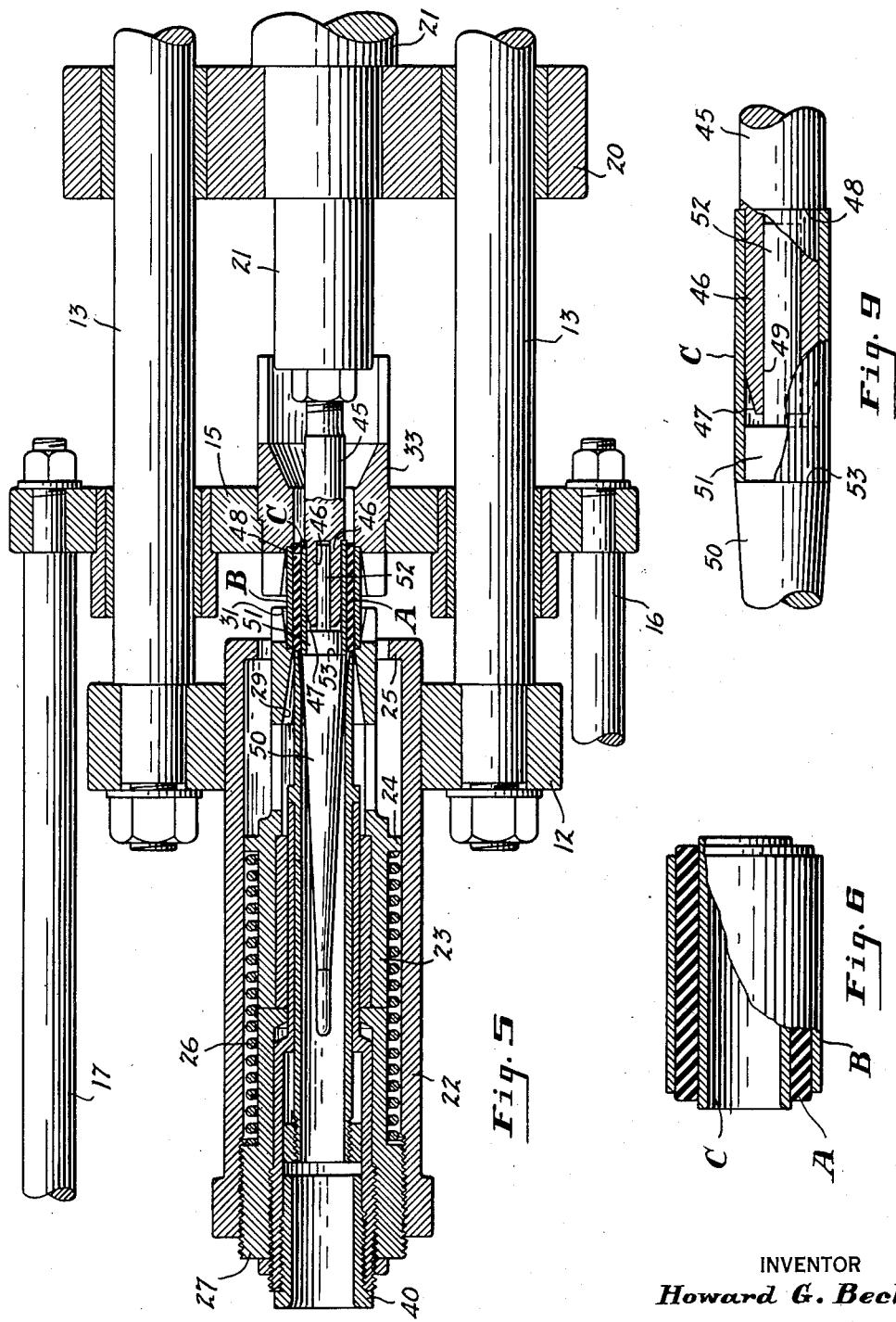

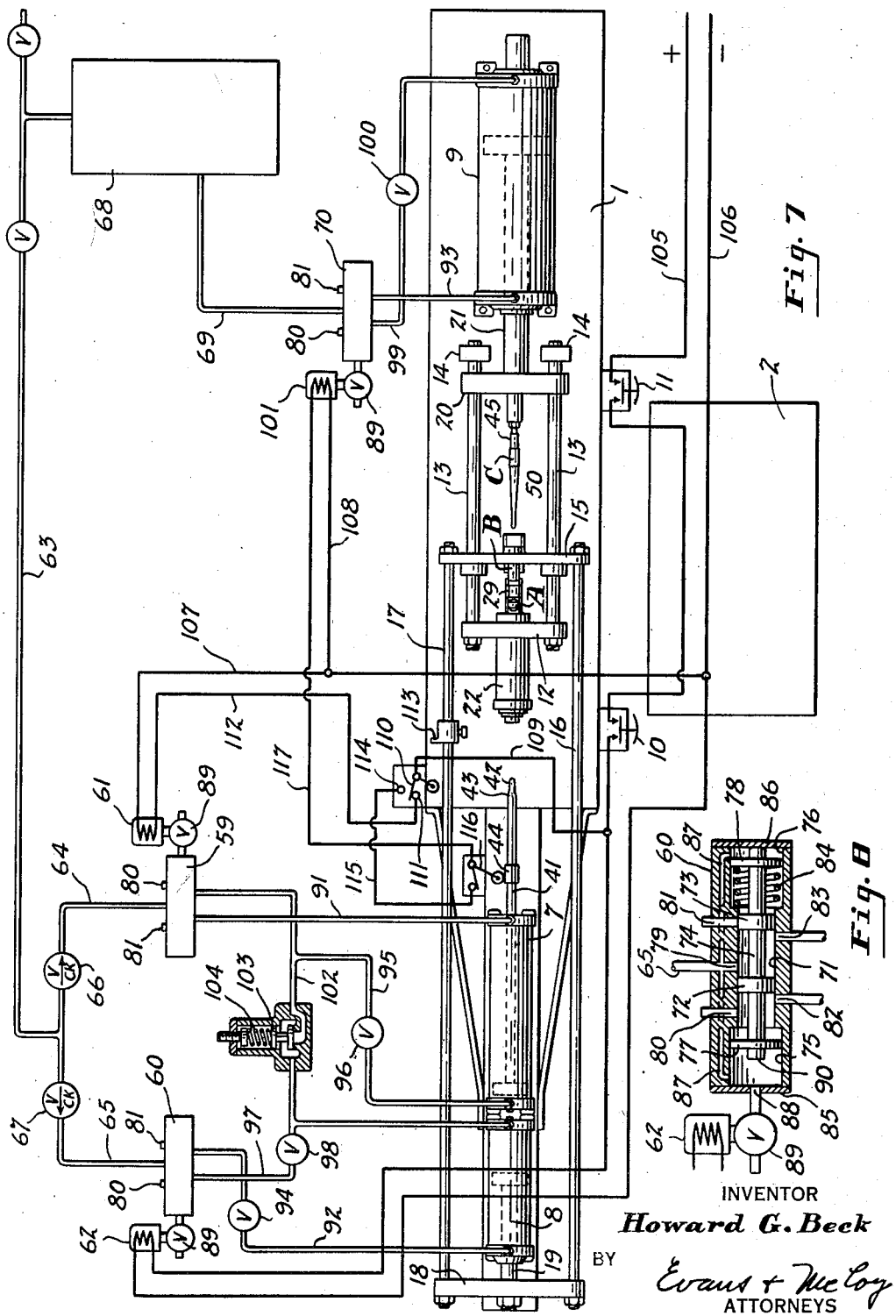

2,660,780

UNITED STATES PATENT OFFICE 2,660,780

APPARATUS FOR ASSEMBLING AN ELASTIC TUBULAR RUBBER INSERT UNDER RADIAL COMPRESSION BETWEEN AN OUTER RIGID TUBE AND AN INNER RIGID CORE

Howard G. Beck, Akron, Ohio, assignor to The General Tire and Rubber Company, Akron, Ohio, a corporation of Ohio Application November 26, 1948, Serial No. 62,002

9 Claims. (Cl. 29—235)

This invention relates to apparatus for assembling an elastic tubular rubber insert under radial compression between an outer rigid tube and an inner rigid core to form a yieldable unit for use in articulated joints, vibration dampening supports and the like.

The invention has for an object to provide means by which the assembly is effected with a minimum distortion of the elastic rubber insert.

A further object is to provide an assembling apparatus by means of which the yieldable units can be assembled with rapidity and with small expenditure of power.

A further object is to provide a positively operated machine by means of which the inserts and core member are very accurately positioned with respect to each other and with respect to the outer shell.

The present invention is an improvement on that disclosed and claimed in co-pending application of Raymond H. Cowles, Serial No. 62,072, filed November 26, 1948.

Reference should be had to the accompanying drawings forming a part of this specification, in which:

Figure 1 is a front elevation of an assembling machine embodying the invention;

Fig. 2 is a fragmentary horizontal section taken on the line indicated at 2—2 in Fig. 1;

Figs. 3, 4 and 5 are sections similar to Fig. 2, showing the parts in successive operating positions;

Fig. 3 shows the outer tube clamped to the funnel-shaped guide through which the elastic rubber insert is forced into the outer tube and the insert pressing plunger in engagement with the insert;

Fig. 4 shows the insert within the outer sleeve in the position which it occupies prior to insertion of the core;

Fig. 5 shows the core carrying plunger fully advanced and the core in place within the rubber insert;

Fig. 6 is a sectional view showing the completed assembly;

Fig. 7 is a top plan view of the machine showing the fluid pressure system and electrical controls diagrammatically;

Fig. 8 is a longitudinal section through one of the solenoid operated pressure controlled valves; and Fig. 9 is a fragmentary view partially in section and on an enlarged scale showing the manner of mounting the core pilot on the core inserting plunger.

The accompanying drawings show a machine for assembling a tubular rubber insert A within an outer metal sleeve B and around an inner tubular core C, the completed assembly being shown in Fig. 6 of the drawings.

The machine of the present invention is mounted upon a table 1 in front of which there is provided an operator's platform 2 and to the rear of which there is provided a bin 3 having compartments 4, 5 and 6 for inserts A, outer tubes B and core tubes C, respectively.

Upon the table 1 there are mounted three axially alined cylinders 7, 8 and 9, and on the table 1 in front of the platform 2 there are two palm switches 10 and 11 which control the operation of the machine. The switches 10 and 11 are in series and must be held closed by the operator during the operation of the machine. Since both hands of the operator are required to be upon the switches 10 and 11 during operation of the machine, it is not possible for the operator to get a hand into the path of a moving part of the machine.

Substantially midway between the ends thereof the table 1 is provided with a fixed standard 12 and to this standard there are secured two parallel horizontally disposed longitudinal guide rods 13 which extend toward the cylinder 9 and which are supported adjacent the inner end of the cylinder 9 on posts 14. A crosshead 15 is slidably mounted on the guide rods 13 and is connected by parallel tie rods 16 and 17 disposed upon opposite sides of the cylinders 7 and 8 to a crosshead 18 that is attached to the piston 19 of the cylinder 8, the cylinder 8 serving to move the crosshead 15 toward and away from the fixed standard 12. A second crosshead 20 is slidably mounted on the rods 13 and is attached to the piston 21 of the cylinder 9.

A horizontally disposed cylindrical housing 22 is attached at its inner end to the standard 12 and extends from the standard 12 toward the cylinder 7 in axial alinement therewith. Within the housing 22 there is mounted a slide 23 that projects from the inner end of the housing. The slide 23 has a portion 24 slidably fitting within the housing 22 and the housing 22 is provided with a shoulder 25 with which the portion 24 engages to limit the inward movement of the slide 23. The slide 23 is normally held at its inward limit of movement by a spring 26 interposed between the slide 23 and a stop sleeve 27 adjustably mounted in the outer end of the housing 22.

The slide 23 has an outer end portion 28 that projects past the inner end of the housing 22 and has a funnel-shaped guide portion 29, the large end of which faces toward the cylinder 7 and the slide is formed adjacent the large end of the funnel guide 29 to provide a seat 30 for an insert A that is adapted to support the insert substantially in axial alinement with the funnel. At the inner end of the slide 23 a seat 31 is provided for supporting one end of an outer tube B in axial alinement with the small end of the funnel guide 29, the funnel guide 29 being provided with a clamping shoulder 32 against which the tube B may be clamped. The small end of the funnel 29 is of a diameter corresponding substantially to the internal diameter of a tube B and during each operation of the machine an insert is forced through the funnel guide 29 into a tube B. In axial alinement with the funnel guide 29 the crosshead 15 carries a tubular guide member 33 that is axially alined with the funnel guide 29 and that has a seat 34 at its inner end that alines with the seat 31 of the slide to support the end of a tube B opposite that supported on the seat 31. The guide member 33 also has a flat shoulder 35 at its inner end engageable with an end of the tube B to clamp the tube against the shoulder 32 of the funnel guide 29.

Within the sleeve 27 there is an adjustable tubular guide 36 which is screwed into the sleeve 27. The inner end of the guide 36 is slidably received in an axial bearing sleeve 37 in the slide 23 and serves to guide a plunger sleeve 38 which slides in the guide 36 and sleeve 37, the plunger sleeve 38 having an external shoulder 39 fitting in the sleeve 37 and engageable with the inner end of the guide 36 to limit the outward movement of the sleeve 38.

A guide sleeve 40 is mounted in the outer end of the tubular guide 36 and the cylinder 7 has a piston 41 extending inwardly toward the housing 22 that serves as a plunger to force the insert A into the tube B and that has a tapered punch portion 42 at its end that is adapted to enter an insert A on the ledge 30 and inwardly of the punch 42 the piston has an insert engaging shoulder 43 through which thrust is applied to the insert. The plunger 41 is received within the plunger sleeve 38 and has a collar 44 thereon that engages with the outer end of the plunger sleeve 38 to move the sleeve inwardly with the plunger 41 when the plunger 41 is moved into engagement with the insert A. The collar 44 is so adjusted that the inner end of the plunger sleeve 38 engages the insert near its periphery while the shoulder 43 engages the insert adjacent its opening. The plunger sleeve 38 is of an external diameter but slightly less than the internal diameter of the tube B so that the sleeve 38 and plunger 41 engage a substantial portion of the end of the insert A to force the same through the funnel guide 29 and to slide the insert within the tube B toward the end thereof opposite that engaging the funnel.

In the operation of the machine the insert A and tube B are assembled on opposite sides of the funnel guide 29 as shown in Fig. 2, after which the tube B is clamped by operation of the cylinder 8 between the shoulders 32 and 35 as shown in Fig. 3 and the plunger 41 is advanced by operation of the cylinder 7 into engagement with the insert A and the sleeve 38, after which the insert is forced into the tube B by continued movement of the crosshead 15. The plunger 41 and the sleeve 38 are held in their extended positions by air pressure in the cylinder 7 while the crosshead 15 is moved toward the standard 12 by the cylinder 8, forcing the slide 23 into the housing 22 and causing the insert A to pass through the funnel guide 29 into the tube A. The punch portion 42 of the plunger 41 is shaped to conform substantially to the shape which the interior of the elastic rubber insert A naturally assumes when forced axially into the outer tube B by endwise pressure, and serves to prevent excessive distortion of the insert A during its passage through the funnel guide 29 and into the tube B. The punch portion 42 of the piston also provides a space of substantially predetermined volume exteriorly thereof and within the tube B so that the insert A after being forced into the tube B is of a predetermined length and is accurately positioned by the plunger 41 and plunger sleeve 38.

After the insert is placed within the tube B as shown in Fig. 4, the plunger 41 is retracted and the piston 21 which serves as a core inserting plunger is advanced to insert the tubular core within the rubber insert A. The piston 21 has an axial extension 45 detachably secured to its inner end that has a reduced inner end portion 46 of a size to fit within a core tube C. The reduced end 46 is preferably of a length greater than one-half the length of the tube C and has a tapered end 47 to facilitate its entry into the tube, the tube C being positioned on the end portion 46 by a shoulder 48 against which the outer end of the tube engages. The reduced end 46 has an axial bore 49 which serves to support a long tapered pilot 50 which has an outer end portion 51 that fits within the core tube C, a reduced end portion 52 that fits in the axial bore 49 and a shoulder 53 that engages the inner end of the core tube C. The outer diameter of the shoulder 53 is the same as the external diameter of the tube C and the pilot 50 tapers at a small angle from the shoulder 53 to a tip small enough to enter the opening of an insert A previously placed within the tube B.

With the core tube C and tapered core pilot 50 assembled on the inner end of the plunger 21 as shown in Figs. 2, 5 and 6, the plunger 21 is actuated to advance the pilot 50 through an insert A previously placed within the tube B. Since the large end of the tapered pilot 50 is of the same diameter as the tube C, the tube C enters the insert A immediately behind the tapered pilot 50.

When the insert A is forced into the tube B through the funnel 29 by means of the plunger 41 and plunger sleeve 38 the insert A is compressed radially and axially and expanded radially inwardly against the punch 42 which serves to maintain a substantially uniform movement of the peripheral portion of the insert through the funnel guide and to prevent rolling of the insert in the guide 29 or tube B. After entering the tube B the insert A is moved bodily within the tube B to a position in which the end thereof remote from that engaged by the plunger 41 and sleeve 38 is substantially flush with the end of the tube B opposite that into which the insert is forced. The movement of the insert A in the tube B is resisted solely by the friction between the interior of the tube and the exterior of the insert so that the placing of the insert within the tube B is accomplished with a minimum distortion of the rubber insert and with a minimum radial outward pressure on the interior of the tube, so that a comparatively small axial thrust is required to place the insert within the tube B. Also the stresses set up in the elastic rubber insert by the axial pressure of the plunger 41 and tubular plunger sleeve 38 tend to expand the insert toward the end of the tube into which the insert was entered.

When the elongated tapered core pilot 50 is engaged with the insert A the thrust exerted by the pilot 50 on the insert is in a direction to increase the internal stresses within the insert that tend to expand the insert toward the end of the tube A into which it was entered so that as the tapered pilot passes through the insert the insert is gradually elongated with a minimum of resistance to the passage of the core pilot and entry of the core C. The volume of the insert is such that it occupies substantially the full length of the space between the tubes B and C so that the entry of the core merely causes elongation of the insert in the direction of movement of the pilot and core. The plunger sleeve 38 moves freely during placement of the core tube C until the shoulder 39 engages the inner end of the tubular guide 36 so that a positive stop is provided to insure proper positioning of the insert without impeding the axial expansion of the insert due to passage of the pilot and entry of the core. By forcing the insert under pressure into one end of the tube B and subsequently forcing the core tube C into the insert behind an elongated tapered pilot from the opposite end of the tube B, the stresses within the insert A due to the axial and radial thrusts to which it was subjected when forced into the tube B are substantially equalized and a minimum resistance is offered to the movement of the insert relative to the tubes. Consequently a relatively small amount of power is required and the percentage of defective assemblies due to distortion of the elastic rubber insert is very greatly reduced.

In order to obtain rapidity of operation, means is provided for automatically operating the fluid pressure cylinders 7, 8 and 9 in the proper sequence after the insert A, tube B, tube C and pilot 50 are assembled as shown in Fig. 2 of the drawings and the starting switches are closed. The delivery of air under pressure to the cylinders 7 and 8 is controlled by means of four-way valves 59 and 60 which are controlled by means of solenoids 61 and 62 to operate the cylinders 7 and 8 in the proper sequence. Air under pressure is delivered to the valves 59 and 60 from a pressure line 63 through branch lines 64 and 65 that are provided with check valves 66 and 67 which prevent reversal of air flow through the lines 64 and 65. The pressure line 63 is connected to a pressure tank 68 which delivers air under pressure through a line 69 to a four-way valve 70 that controls the delivery of air under pressure to the cylinder 9.

In Fig. 8 of the drawings the valve 60 is shown in detail. The valves 59 and 70 may be identical with the valve 60. As shown in Fig. 8 the valve 60 has a longitudinal bore 71 which receives the spaced pistons 72 and 73 of a valve spool 74. The opposite ends of the valve are provided with counterbores 75 and 76 which receive pistons 77 and 78 attached to the valve spool 74. The valve has a central pressure receiving port 79 which communicates with the bore 71 midway between its ends, and also has exhaust ports 80 and 81 on opposite sides of the port 79. Delivery ports 82 and 83 are provided which are on opposite sides of the pressure port 79 but at a lesser distance from the pressure port than the exhaust ports 80 and 81.

The valve spool 74 is normally held in a position in which the piston 73 closes the exhaust port 81 and the piston 82 is positioned between the pressure port 79 and the exhaust port 80 and delivery port 82 by means of a coil spring 84 that is interposed between the piston 78 and the bottom of the counterbore 76. The opposite ends of the valve 60 are closed by heads 85 and 86 and the spaces between the pistons 77 and 78 and the heads 85 and 86 are connected to the pressure inlet port 79 through an equalizing passage 87, and since the pistons 77 and 78 are of the same size the pressure acting upon the spool valve is normally equalized. The head 85 is provided with a central exhaust port 88 that is controlled by a normally closed valve 89 that is operated by the solenoid 62. When the valve 89 is opened by the solenoid 62 the air is allowed to escape from the space between the piston 77 and the head 85, thereby reducing the pressure acting upon the piston 77 so that the pressure acting upon the piston 78 moves the valve spool in opposition to the spring 84 until an end portion 90 of the valve spool that projects past the piston 77 closes the port 88 except for slight leakage sufficient to maintain a pressure differential that overcomes the thrust of the spring 84. When the valve spool is moved into engagement with the head 85 the delivery port 83 is connected with the exhaust port 81 and the pressure port 79 is connected to the delivery port 82.

The valve 59, which is identical with the valve 60 except that it is reversely disposed, is connected by a pipe line 91 to the inner end of the cylinder 7, the pipe line 91 being connected to the delivery port 83 which is normally connected to the pressure line so that the plunger 41 of the cylinder 7 is normally held in retracted position by the air pressure.

The delivery port 83 of the valve 60 is connected by a pipe line 92 to the outer end of the cylinder 8 so that the piston 19 of the cylinder 8 is normally held in retracted position by the air pressure. A manually operable flow control valve 94 may be provided in the pipe line 92 to regulate the rate of flow of air into and out of the cylinder 8 to control the speed of retraction of the piston 19 and crosshead 15.

The pipe line 93 connects the port 83 of the valve 70 with the inner end of the cylinder 9 to normally hold the plunger 21 in retracted position.

The port 82 of the valve 59 is connected to the outer end of the cylinder 7 by a pipe line 95 in which a manually adjustable flow control valve 96 may be placed to regulate the speed of advancement of the plunger 41.

A pipe line 97 connects the port 82 of the valve 60 with the inner end of the cylinder 8 and a manually operable flow control valve 98 in the line 97 controls the rate of flow of air to the cylinder 8 through the line 97 to control the speed of advancement of the piston 19 and head 15.

A pipe line 99 connects the port 82 of the valve 70 to the outer end of the cylinder 9 and this pipe line has a manually operable flow control valve 100 for regulating the rate of flow of air through the line 99 and the speed of advancement of the piston 19.

The pilot valve 89 of the four-way control valve 70 is operated by a solenoid 101 which when energized opens the valve 89 to actuate the valve 70 and reverse the pressure in the cylinder 9.

The pipes 95 and 97 delivering to the outer end of the cylinder 7 and to the inner end of the cylinder 8, respectively, are connected by a by-pass line 102 which is provided with a sequence valve 103 that permits flow of air from the line 95 to the line 97 when a predetermined pressure is developed in the line 95.

The valve 103 is backed by a spring 104 which may be adjusted to vary the pressure at which the valve 103 opens. The bypass 102 and sequence valve 103 serve to increase the pressure applied to the inner end of the cylinder 8 and increase the speed of the piston 19 after the plunger 41 has been advanced to insert engaging position.

In the operation of the machine the solenoids 61 and 62 are simultaneously energized to actuate the valves 59 and 60 to deliver pressure simultaneously to the outer end of the cylinder 7 and to the inner end of the cylinder 8 to move the plunger 41 into the housing 22 and into engagement with the insert A while simultaneously moving the crosshead 15 toward the slide 23 to clamp the outer tube B against the funnel guide 29.

When the plunger 41 reaches the forward end of its stroke, pressure builds up in the cylinder 7 and line 95 until the valve 103 is opened, so that an increased pressure is then delivered to the inner end of the cylinder 8 to complete the movement of the crosshead 15, forcing the slide 23 inwardly against the spring 26 until the funnel 29 has passed over the insert and the insert has been forced into the tube B, as shown in Fig. 4. The plunger 41 is then retracted and the plunger 21 is advanced to force the pilot 46 through the insert and place the core tube C within the insert A.

The palm switches 10 and 11 are in series with the solenoid 62 in a power line 105, one terminal of the solenoid 62 being connected to the line 105 and the other terminal of the solenoid 62 being connected to a power line 106. The solenoids 61 and 101 are also connected to the power line 106 through lines 107 and 108. A line 109 connected to the line 105 between the switch 10 and the solenoid 62 extends to a switch 110 that normally engages a contact 111 that is connected by a line 112 to the solenoid 61. The switch 110 is actuated by a trip member 113 attached to the tie rod 17. The trip member 113 is adjustably connected to the rod 17 and engages the switch 110 to shift the same out of engagement with the contact 111 when the piston 19 approaches its fully extended position and the crosshead 15 is closely adjacent the housing 22. The switch 110 is movable from a position engaging the contact 111 to a position engaging a contact 114 that is connected by a line 115 to a second switch 116 that is operated by the collar 44 on the plunger 41 when the plunger 41 approaches its fully retracted position. The switch 116 is connected by a line 117 to the solenoid 101 so that the solenoid 101 is energized when the switch 110 engages the contact 114 and the switch 116 is closed.

The control valves 59, 60 and 70 are held by their springs 84 in positions to deliver pressure to the inner end of the cylinder 7, to the outer end of the cylinder 8 and to the inner end of the cylinder 9 so that the pistons 19, 21 and 41 are normally held in their fully retracted positions. With the pistons all in retracted positions the switch 110 engages the contact 111 and the switch 116 is closed. The switches 110 and 116 may be micro-switches which are adapted to be operated by a minute movement of a trip member after engagement therewith.

When the palm switches 10 and 11 are simultaneously closed by the operator, solenoids 61 and 62 are simultaneously energized but the solenoid 101 is not energized for the reason that the switch 110 is out of engagement with the contact 114. Energization of the solenoids 61 and 62 shifts the valves 59 and 60 to positions to deliver air under pressure to the outer end of the cylinder 7 and to the inner end of the cylinder 8, causing the plunger 41 to move inwardly toward the standard 12 into engagement with the insert and causing the crosshead 15 to move toward the standard 12 to clamp the tube B.

After the plunger 41 is fully advanced the sequence valve 103 is immediately operated to increase the pressure on the piston 19 and increase the thrust on the crosshead 15 during the final portion of its stroke. As the crosshead 15 approaches the end of its operating stroke the trip member 113 shifts the switch 110 out of engagement with the contact 111, deenergizing the solenoid 61 so that the valve 59 returns to its normal position, reversing the pressure in the cylinder 7 to retract the plunger 41. As the plunger 41 approaches its fully retracted position the switch 116 is closed and since the trip 114 has moved the switch 110 into the contact 114 the solenoid 101 is now energized, actuating the switch 70 to apply pressure to the outer end of the cylinder 9 to advance the plunger 21 and insert the tubular core C within the insert A previously placed within the outer tube B.

Upon completion of the stroke of the plunger 21 the assembling operation is completed and the operator removes his hands from the switches 10 and 11, deenergizing the solenoids 101 and 62 so that the pressure is reversed in the cylinders 8 and 9 to retract the pistons 19 and 21, bringing all the parts to the starting position so that the operator can again assemble the insert A, the tube B, the tubular core C and the pilot 50 ready for another assembling operation.

It is to be understood that in accordance with the provisions of the patent statutes, variations and modifications of the specific devices herein shown and described may be made without departing from the spirit of the invention.

What I claim is:

1. Apparatus for assembling an elastic tubular rubber insert within an outer rigid tube and around an inner rigid core comprising a support, an open ended funnel shaped guide carried by said support, means for clamping an insert receiving tube to the small end of said funnel in axial alinement therewith, a plunger on the side of said support toward which the large end of said funnel faces for forcing an insert through the funnel and into said tube, said plunger being axially alined with said funnel and movable axially into and out of insert engaging position, a second plunger axially alined with the first and on the opposite side of said support, said second plunger being movable toward said tube to force a core into an insert within the tube, means for reciprocating said first plunger, means controlled by said first plunger during its movement away from said insert for reciprocating the second plunger, and means for limiting the axial movement of the insert in the tube toward said first plunger.

2. Apparatus for assembling an elastic tubular rubber insert within an outer rigid tube and around an inner rigid core comprising a support, an open ended funnel shaped guide carried by said support for axial sliding movement and having a clamping face at the small end of the funnel, means for supporting a tube in axial alinement with said funnel, a fluid pressure operated clamping member for pressing said tube against said clamping face and for moving said funnel guide axially, said clamping member having an opening axially alined with said tube, means for supporting an insert in axial alinement with said funnel, a plunger axially alined with said funnel and movable axially into and out of insert engaging position, a second plunger alined with the first plunger at the opposite side of said funnel, a tapered core pilot the large end of which is the same diameter as the core, means for supporting said core and core pilot end to end on said second plunger in axial alinement with the clamped tube, fluid pressure operated means for actuating said first plunger, a second fluid pressure operated means for actuating said second plunger to move said core pilot through the opening in said clamping member and through said insert and said core behind said pilot into said insert, and means controlling said fluid pressure operated means to actuate said plungers successively.

3. Apparatus for assembling a tubular rubber insert under radial compression between an outer rigid tube and an inner rigid core comprising a support, an insert engaging plunger and a core inserting plunger mounted in opposed relation and in axial alinement on said support, a funnel insert guide axially alined with said plungers and having its large end toward the insert engaging plunger and its small end toward the core inserting plunger, means for clamping a tube against the small end of the funnel insert guide in registry therewith and in axial alinement with said plungers, means for supporting an insert between said guide and said insert engaging plunger in axial alinement with the guide and plunger, a tapered core pilot having means at its large end for supporting a core, means for supporting the core and pilot on the core inserting plunger in axial alinement therewith, and fluid pressure cylinders for successively causing relative axial movements between said insert engaging plunger and the clamped tube to place the insert within the tube and between said core inserting plunger and the clamped tube to place the core within the insert.

4. Apparatus for assembling a tubular rubber insert under radial compression between an outer rigid tube and an inner rigid core comprising a support, an insert engaging plunger and a core inserting plunger mounted in opposed relation and in axial alinement on said support, a funnel insert guide axially alined with said plungers and having its large end toward the insert engaging plunger and its small end toward the core inserting plunger, means for clamping a tube against the small end of the funnel insert guide in registry therewith and in axial alinement with said plungers, means for supporting an insert between said guide and said insert engaging plunger in axial alinement with the guide and plunger, a tapered core pilot having means at its large end for supporting a core, means for supporting the core and pilot on the core inserting plunger in axial alinement therewith, fluid pressure cylinders for successively causing relative axial movements between said insert engaging plunger and the clamped tube to place the insert within the tube and between said core inserting plunger and the clamped tube to place the core within the insert, and means to limit the movements of said plungers relative to said tube to position the insert and core within the tube.

5. Apparatus for assembling a tubular elastic rubber insert under radial compression between an outer rigid tube and an inner rigid core comprising a support, two movable tube clamping members, the first having a tube engaging face and a funnel insert guide formed therein with its small end opening to said face, the second having a tube engaging face opposed to the tube engaging face of the first and axially alined with the funnel guide, means carried by said clamping members for supporting a tube between said members in axial alinement with said guide and opening and for supporting an insert in axial alinement with said funnel guide, a spring pressing the first clamping member toward the second, a stop limiting the movement of said first clamping member by said spring, a motor for moving the second clamping means toward the first and both clamping members with a tube clamped between them in opposition to said spring, an insert engaging plunger axially alined with the funnel guide on the side thereof toward which the clamping members are moved by said motor, means for advancing and retracting said plunger and for holding the same in advanced position to force the insert through the funnel guide into said tube, a core inserting plunger axially alined with the insert engaging plunger on the opposite side of said clamping members, a motor for actuating said core inserting plunger, and means for actuating said motors sequentially.

6. Apparatus for assembling a tubular rubber insert under radial compression between an outer rigid tube and an inner rigid core comprising a support, an insert engaging plunger and a core inserting plunger mounted in opposed relation and in axial alinement on said support, a funnel insert guide axially alined with said plungers and having its large end toward the insert engaging plunger and its small end toward the core inserting plunger, said guide being slidably mounted on said support and having means for supporting an insert adjacent its large end and in axial alinement with the plungers, a spring pressing said guide inwardly toward the core inserting plunger, a stop limiting the inward movement of the guide, a tube clamping member slidably mounted on said support for movement axially of said plungers toward and away from said guide to clamp a tube in registry with said guide and in axial alinement with said plungers, a fluid pressure cylinder for actuating said clamping member and for moving said guide and the clamped tube toward said insert engaging plunger in opposition to said spring, a second fluid pressure cylinder for advancing and retracting said insert engaging plunger, a third fluid pressure cylinder for actuating said core inserting plunger, stops limiting inward movements of said plungers and outward movement of said guide, and means for controlling the operation of said cylinders.

7. Apparatus for assembling a tubular rubber insert under radial compression between an outer rigid tube and an inner rigid core comprising a support, an insert engaging plunger and a core inserting plunger mounted in opposed relation and in axial alinement on said support, a funnel insert guide axially alined with said plungers and having its large end toward the insert engaging plunger and its small end toward the core inserting plunger, said guide being slidably mounted on said support and having means for supporting an insert adjacent its large end and in axial alinement with the plungers, a spring pressing said guide inwardly toward the core inserting plunger, a stop limiting the inward movement of the guide, a tube clamping member slidably mounted on said support for movement axially of said plungers toward and away from said guide to clamp a tube in registry with said guide and in axial alinement with said plungers, a fluid pressure cylinder for actuating said clamping member and for moving said guide and the clamped tube toward said insert engaging plunger in opposition to said spring, a second fluid pressure cylinder for advancing and retracting said insert engaging plunger, a third fluid pressure cylinder for actuating said core inserting plunger, stops limiting inward movements of said plungers and outward movement of said guide, pressure controlling means for simultaneously operating said first and second cylinders to actuate said clamping member and advance said plunger, means controlled by said clamping member for reversing the pressure in the second cylinder to retract said insert engaging plunger and means controlled by said insert engaging plunger for supplying pressure to the third cylinder to advance the core inserting plunger.

8. Apparatus for assembling a tubular rubber insert under radial compression between an outer rigid tube and an inner rigid core comprising a support, an insert engaging plunger and a core inserting plunger mounted in opposed relation and in axial alinement on said support, means between the inner ends of said plungers for holding a tube in axial alinement with said plungers, means for moving said holding means to move said tube toward said insert engaging plunger, means for advancing said insert engaging plunger and holding the same in advanced position during said movement of said tube and then retracting the said insert engaging plunger, and means controlled by the retracting movement of said insert engaging plunger for advancing said core inserting plunger.

9. Apparatus for assembling a tubular elastic rubber insert between an outer rigid tube and an inner rigid core comprising a support, an insert engaging plunger and a core inserting plunger mounted in opposed relation and in axial alinement on said support, a tube holder slidable on said support axially of said plungers and having means for supporting a tube in axial alinement with said plungers and with its ends open to receive said plungers, a funnel guide between said insert engaging plunger and said tube holder, means for supporting an insert between said guide and insert plunger and in axial alinement with the guide and plunger, a sleeve slidable on said plunger and engageable with the insert radially outwardly of the plunger, a collar on the plunger engageable with the outer end of said sleeve to move the same inwardly toward the insert, a stop for limiting movement of the sleeve in the outward direction, means for advancing said plunger to engage said collar with said sleeve and to hold the plunger and sleeve in advanced position, means for moving said tube holder toward the insert engaging plunger to engage the insert with the plunger and enter the insert into the tube, means for retracting said insert engaging plunger, means controlled by the movement of the tube holder for retracting said insert engaging plunger, and means controlled by the retracting movement of said insert engaging plunger for advancing said core inserting plunger.

HOWARD G. BECK.

References Cited in the file of this patent
UNITED STATES PATENTS

| Number | Name | Date |
|---|---|---|
| 1,677,860 | Ferris | July 17, 1928 |
| 1,739,270 | Thiry | Dec. 10, 1929 |
| 1,830,814 | Thiry | Nov. 10, 1931 |
| 1,904,931 | Rosenberg | Apr. 18, 1933 |
| 1,913,933 | Lamborn | June 13, 1933 |
| 1,959,254 | Zerk | May 15, 1934 |
| 1,961,536 | Thiry | June 5, 1934 |
| 2,008,772 | Robertson | July 23, 1935 |
| 2,031,797 | Tarbox | Feb. 25, 1936 |
| 2,117,046 | Welker | May 10, 1938 |
| 2,252,299 | McCoy | Aug. 12, 1941 |
| 2,347,780 | Hermanns | May 2, 1944 |
| 2,446,621 | Thiry | Aug. 10, 1948 |
| 2,492,227 | Korecky | Dec. 27, 1949 |
| 2,550,564 | Hutton | Apr. 24, 1951 |